United States Patent [19]

Latzer John B.

[11] 4,344,299

[45] Aug. 17, 1982

[54] TRANSPORTABLE COMPARTMENT REFRIGERATION PANEL SYSTEM AND METHOD OF INSTALLING

[76] Inventor: Latzer John B., 1010 E. Cypress Dr., Pompano Beach, Fla. 33060

[21] Appl. No.: 156,567

[22] Filed: Aug. 5, 1980

[51] Int. Cl.³ ............................................. F25D 19/02
[52] U.S. Cl. ........................................ 62/448; 62/451; 62/524
[58] Field of Search ................. 62/405, 451, 457, 524, 62/525, 511, 239, 298, 449, 448

[56] References Cited

U.S. PATENT DOCUMENTS

| | | | |
|---|---|---|---|
| 2,158,716 | 5/1939 | Bergdoll | 62/524 X |
| 2,237,261 | 4/1941 | McGrath | 62/524 X |
| 2,509,779 | 5/1950 | Morrison | 62/448 X |
| 2,540,956 | 2/1951 | Morrison | 62/448 |
| 2,959,939 | 11/1960 | Arzberger | 62/451 |
| 2,992,545 | 7/1961 | Walker | 62/451 |
| 3,251,198 | 5/1966 | Cornelius | 62/451 |
| 3,507,322 | 4/1970 | Tetrick et al. | 62/448 |
| 3,677,028 | 7/1972 | Raymond | 62/511 |
| 3,902,332 | 9/1975 | Torcomian | 62/451 |

*Primary Examiner*—Lloyd L. King
*Attorney, Agent, or Firm*—Malin & Haley

[57] ABSTRACT

A refrigeration installation method and system for transportable containers. The refrigeration system comprising at least one refrigeration panel readily attachable to the interior walls of the refrigerated compartment of a truck, rail car, trailer, or shipping container. Each panel includes a heat transfer member that also acts as a protective liner which forms the exterior surface of each panel. The liner protects a layer of insulation, which has its inner surface bonded to the interior surface of the liner, from contact with the goods transported within the refrigerated compartment. The layer of insulation insulates and protects a refrigeration coil which is also affixed to or is made part of the interior surface of the liner. The outer surface of the layer of insulation is placed in contact with the interior walls of the refrigerated compartment. The inlet of each refrigeration panel is connected through an expansion valve to the outlet of a compressor when constructing the entire refrigeration system within the transportable container. The outlet of each refrigeration panel is connected to a common return conduit to the inlet of the compressor. The space between adjacent panels is filled with additional insulation which is protected by a rigid panel in the usual manner for the container construction.

3 Claims, 5 Drawing Figures

4,344,299

TRANSPORTABLE COMPARTMENT REFRIGERATION PANEL SYSTEM AND METHOD OF INSTALLING

BACKGROUND OF THE INVENTION

This invention relates to refrigeration systems and more particularly to a system of refrigeration panels which can be installed within the refrigerated compartment of a transportable container during its construction.

In the past, there have been various refrigeration devices, by way of example is U.S. Pat. No. 3,181,311 which illustrates a refrigerated trailer. However, this invention relates to vehicle body construction where the refrigerant evaporator conduits and insulation must be incorporated within the body structure of the trailer at the time of manufacture. Thus, one manufacturing process is required for a normal trailer and a second manufacturing process is required for a refrigerated trailer.

Another example is described in U.S. Pat. No. 3,303,659 which relates to a refrigeration method and apparatus. This invention teaches the heat exchange process by the use of a refrigerant gas forced through spaced apart flow paths.

Finally, another example of heat transfer panels is illustrated in a brochure by Dean Products, Inc., published in September, 1964. Various panels are shown, but none indicate that insulation is necessary.

The present invention overcomes the problems of the prior inventions by providing a refrigeration system which is especially tailored for use in the refrigerated compartments of transportable containers. Once the transportable container is manufactured, the present invention can be installed, eliminating the need for special body construction of transportable containers designated for transporting refrigerated goods. Since each refrigeration panel is self-contained having a heat transfer member that also may act as a protective liner, refrigeration coil, and insulation layer, any container or compartment can be adapted for refrigeration of goods by adding the refrigeration system. The invention therefore provides a much more flexible system of refrigeration, which is readily adaptable to any container which will transport refrigerated goods.

The new and improved refrigeration system improves the refrigeration efficiency by utilizing less power and by using less fuel to drive the refrigeration units, that is, any well known type presently being used.

SUMMARY OF THE INVENTION

In the refrigeration system, at least one insulated refrigeration panel is attached to the interior wall of the refrigerated compartment of a transportable container. Each panel includes a heat transfer member that also may act as a protective liner, a refrigeration coil, and a layer of insulation. The lining of the panel remains exposed once the panel is secured to the wall of the refrigeration compartment, and provides a heat transfer member, as well as protecting the refrigeration coil and layer of insulation from damage due to contact with goods stored in the refrigerated compartment.

The inner surface of the layer of insulation is mounted to the interior surface of the protective liner and incapsulates the refrigeration coil which is also attached to the interior surface of the protective liner. The layer of insulation not only provides insulation for the refrigeration coil, but also protects the coil from direct contact with the interior wall of the refrigeration compartment and damage due to such contact. The outer surface of the layer of insulation is placed directly to the interior wall of the refrigerated compartment.

The refrigeration coil of each refrigeration panel has an inlet and an outlet protruding from the outer periphery of the refrigeration panel at predetermined locations. The inlet of the refrigeration coil is connected through an expansion valve to the outlet of a compressor system or high side by means of an inlet input feeder conduit. The outlet of each refrigeration panel is connected to a common return conduit which is connected to the inlet of the compressor. Once the panels are installed and the input feeder conduit and return conduit are connected to the compressor, additional insulation is installed to fill the gaps around and between each refrigeration panel. The additional insulation is then covered with any rigid material for protection and to give a finished appearance to the refrigerated compartment. The refrigeration system is then ready for operation by forcing a refrigerant coolant through the respective refrigeration coils of each panel. This causes the refrigerated compartment to cool to the desired temperature.

The primary object of this invention is to provide a simple, economical method of constructing a refrigeration system and compartment within any large transportable shipping container.

It is another object of this invention to provide an improved refrigeration system utilizing easily installed refrigeration panels within the refrigerated compartment of a transportable container.

Another object of this invention is to provide a more economically efficient refrigeration system.

An additional object of the present invention is to provide a more efficient means of refrigeration for transportable containers.

In accordance with these and other objects which will be apparent hereinafter, the instant invention will now be described with particular reference to the accompanying drawings.

DESCRIPTION OF THE PREFERRED EMBODIMENT

Figure 1:
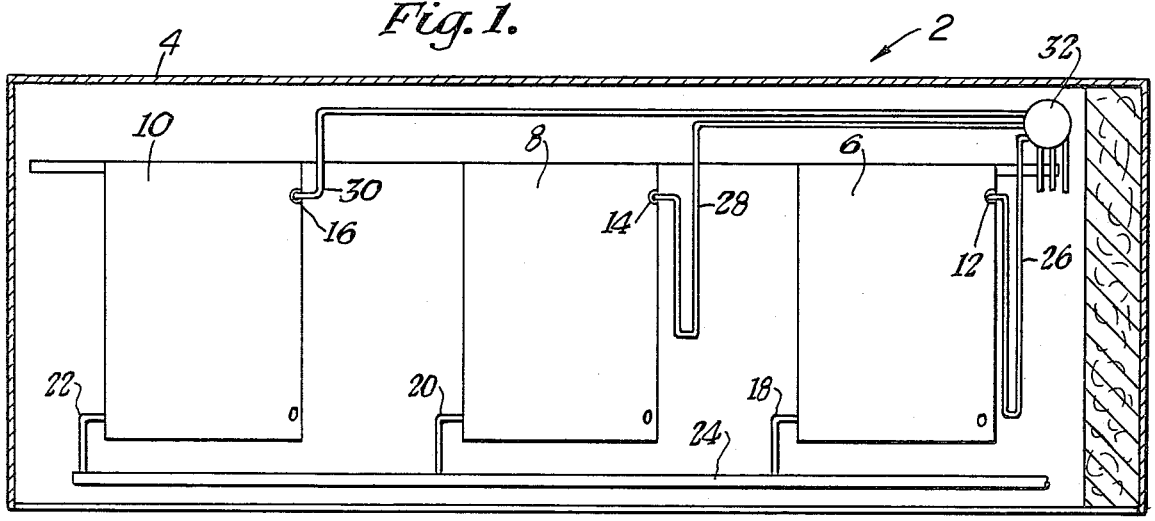
FIG. 1 is a cross-sectional view of a refrigerated compartment exposing a portion of the refrigeration system attached to a side wall of the compartment.

Referring to FIG. 1, the inside wall 4 of a refrigerated vehicle or shipping compartment 2 is illustrated. The vehicle may be a container, transportable refrigerated container that is self-powered or moved by a separate powered vehicle. The vehicle compartment may be detachable from the vehicle. The inside wall has a plurality of refrigeration panels 6, 8, and 10 attached thereto. Each refrigeration panel 6, 8, and 10 has a respective inlet 12, 14, and 16 and a respective outlet 18, 20, and 22. Each inlet 12, 14, and 16 is attached to a respective inlet refrigerant conduit 26, 28, and 30. Each inlet refrigerant conduit is attached through an expansion valve 32 to the outlet of a compressor not shown by way of suitable piping and controls. Each outlet 18, 20, and 22 is connected to a common compressor inlet by way of return conduit 24 which carries the refrigerant to the inlet of the compressor.

Figure 2:
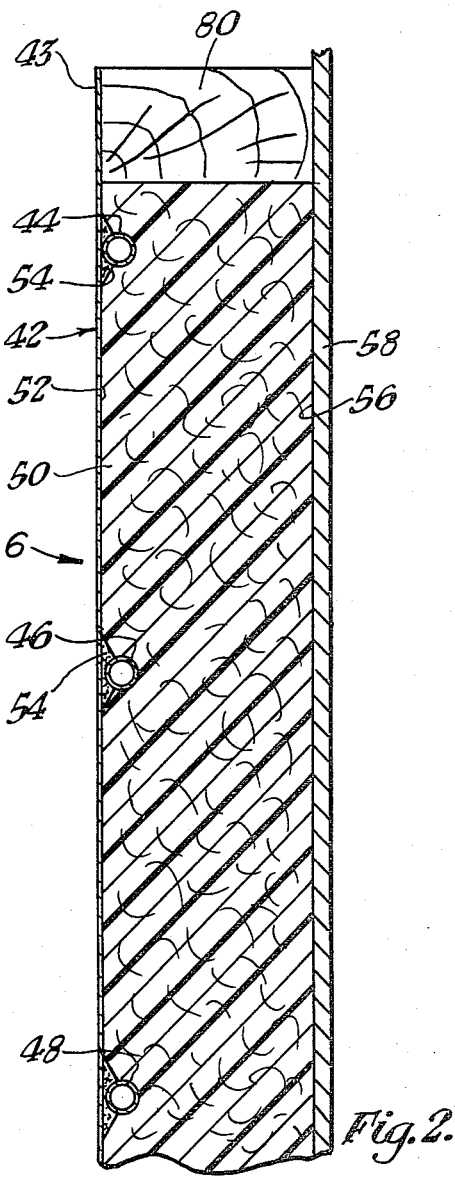
FIG. 2 is a side view in cross section of a single refrigeration panel on a compartment wall.

FIG. 2 illustrates cross sectional side view of a panel 6, shown in FIG. 1. Each panel 6, 8, and 10 is comprised of a heat transfer member or liner 42, a refrigeration conduit 7 which includes coil portions 44, 46, and 48, a means for attaching the coil portions to the heat transfer member 42 and a layer of insulation foam 50 having its inner surface 52 attached to the interior surface of the member or liner 42. The coil portions 44, 46, and 48 may be a tube or other suitable passage as in FIG. 5 having intimate contact with or being a part of line or heat transfer member 42. As in FIG. 5 the member 42 may be a two part member 102 and 103 with the passage being formed between a portion of the area between the two parts or layers. The preferred means for attaching the refrigerant conduit 42, 44, 46, and 48 coils to the protective liner 42 in FIG. 2 is by the use of a thermal mastic 54. The remaining exposed surface 56 of the insulating foam 50 can be fastened to the interior surface wall 58 of a refrigeration compartment as illustrated in FIG. 1.

Figure 3:
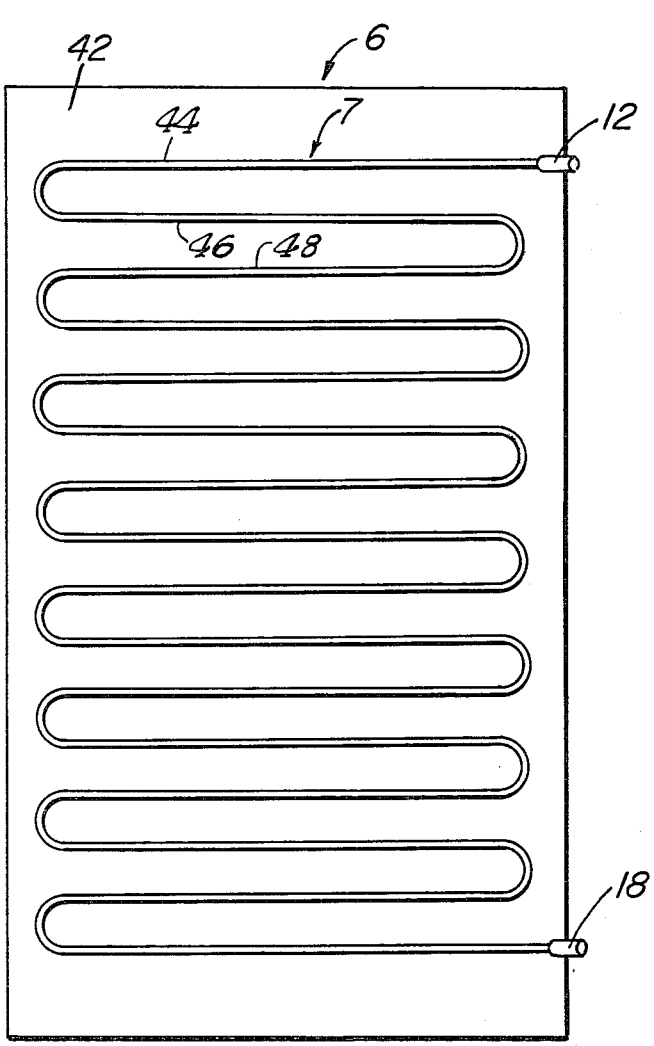
FIG. 3 is an elevational view of the interior surface of a refrigeration panel with the layer of insulation removed.

Now referring to FIG. 3, the front view of the refrigerant conduit 44 attached to the interior surface of the refrigeration panel 6 can be seen. The refrigerant conduit 44 is shaped to illustrate a manner in order to provide maximum efficiency in the heat exchange process.

Figure 4:
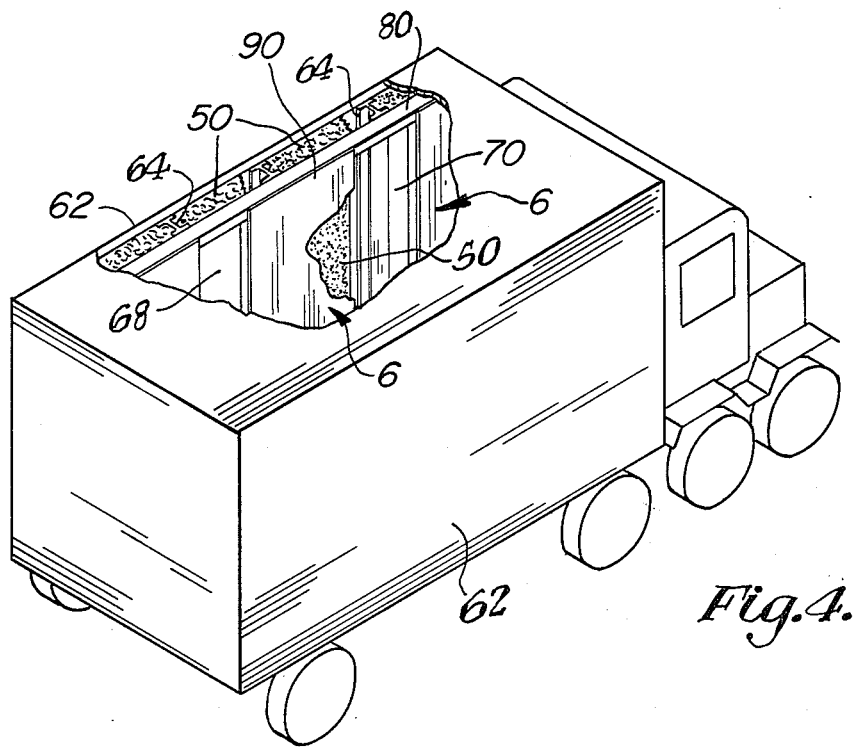
FIG. 4 is an isometric view of a trailer or container.

FIG. 4 represents the illustration of the method of construction of the trailer portion of a refrigerated truck. The metal exterior 62 is fixed to a multiplicity of beams or structural members 64 which are connected to the floor frame of the trailer. A layer of foam insulation 50 is then blown in between each of the beams against the inside of the exterior of a suitable material at a depth approximately equal to the width of each beam. A wooden header 80 is laterally connected near the top of each beam 64 so that the lip 90 of the refrigeration panel 6 can be attached thereto to hold the refrigeration panel 6 in place. The space between each adjacent panel 68 is then sprayed with foam at a depth approximately equal to the depth of the refrigeration panel 6. The foam areas 64 are then covered with a protective metal plate 70.

Figure 5:
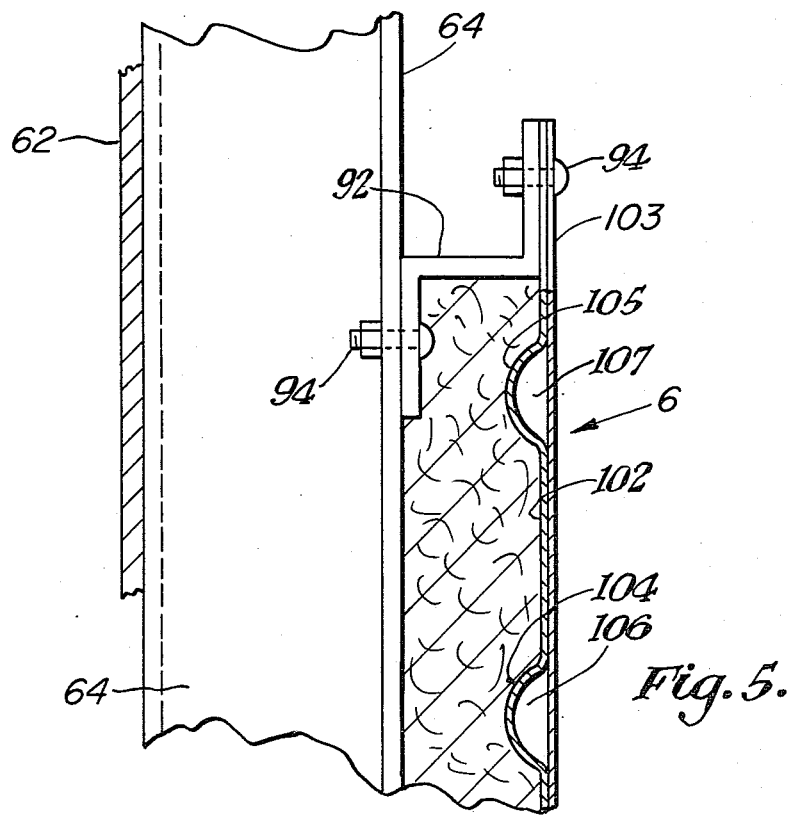
FIG. 5 is side cross sectional view of another embodiment of the panel on a compartment wall.

FIG. 5 also depicts an alternate embodiment of the means for attaching refrigeration panel 6 to the interior surface of the container 62. Bracket 92 interconnects panel 6 to beams 64 by fastening means 94.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A refrigeration system for conversion of a transportable shipping container into a transportable refrigeratable container including a compressor, an expansion valve which receives compressed coolant from said compressor through a compressor output conduit and distributes the coolant to one or more refrigeration panels through one or more refrigeration panel inlet conduits and a compressor input conduit connected to each said refrigeration panel outlet at a predetermined point along its surface, each said refrigeration panel comprising:
   a protective liner means for protecting an internal refrigeration conduit and for connecting with said refrigeration conduit as a heat exchanger;
   an internal refrigeration conduit connected to said protective liner for heat exchange;
   a means for connecting said internal refrigeration conduit to said protective liner for bonding said refrigeration conduit to said protective liner and for increasing the heat exchange contact surface area between said refrigeration conduit and said protective liner;
   an insulation layer means fitted between the surface of said protective liner and the interior surface of a container wall for encapsulating and insulating said refrigeration conduit;
   a means for bonding said insulation layer to said protective liner for securing said protective liner, refrigeration conduit and insulation layer together into a unified self-contained panel;
   a means for attaching said refrigeration panel to an interior wall of said refrigeration compartment at a predetermined location.

2. A refrigeration system as set forth in claim 1, wherein said means for connecting said internal refrigeration conduit to said protective liner is a thermal mastic.

3. A refrigeration system as set forth in claim 2 wherein:
   said insulation layer means is a layer constructed of foam; and
   said means for bonding said insulation layer to said protective liner is a foam bonding agent.

* * * * *